United States Patent [19]
Uenoyama et al.

[11] Patent Number: 5,492,626
[45] Date of Patent: Feb. 20, 1996

[54] METHOD FOR RECYCLING A PAINT RECOVERY EFFLUENT

[75] Inventors: Kazuo Uenoyama, Osaka; Tetsuro Kajino, Ashiya; Toshihiro Okai, Katano; Takayuki Shibata, Yawata; Toshiya Koike, Nishinomiya, all of Japan

[73] Assignee: Nippon Paint Co., Ltd., Japan

[21] Appl. No.: 240,439

[22] Filed: May 10, 1994

[30] Foreign Application Priority Data

May 14, 1993 [JP] Japan ..................................... 5-112800

[51] Int. Cl.⁶ ........................................................ C02F 1/66
[52] U.S. Cl. .............................. 210/651; 95/188; 95/189; 210/712; 210/724; 210/930
[58] Field of Search ............... 95/188, 189; 55/DIG. 46; 210/650, 651, 702, 712, 724, 930

[56] References Cited

U.S. PATENT DOCUMENTS

| | | | |
|---|---|---|---|
| 4,265,642 | 5/1981 | Mir et al. | 210/650 |
| 4,378,235 | 3/1983 | Cosper et al. | 210/708 |
| 4,750,919 | 6/1988 | Patzelt et al. | 95/188 |
| 4,814,092 | 3/1989 | Patzelt | 210/708 |
| 4,919,691 | 4/1990 | Patzelt et al. | 95/189 |
| 5,259,976 | 11/1993 | Bui et al. | 95/188 |
| 5,319,017 | 6/1994 | Uenoyama et al. | 524/514 |

FOREIGN PATENT DOCUMENTS

| | | |
|---|---|---|
| 0508107A1 | 6/1992 | European Pat. Off. |
| 0516326A1 | 12/1992 | European Pat. Off. |
| 0525989A2 | 2/1993 | European Pat. Off. |
| 0525989A3 | 2/1993 | European Pat. Off. |
| 2353469 | 4/1975 | Germany |

*Primary Examiner*—Peter A. Hruskoci
*Attorney, Agent, or Firm*—Pollock, Vande Sande & Priddy

[57] ABSTRACT

The object of the present invention is reuse of the filtrate of a paint mist-cleaning water mixture as cleaning water without reduction in concentration efficiency. According to the present invention, a waste paint-cleaning water mixture 2 available on trapping a water-based paint mist in cleaning water 1 is concentrated to recover the paint and the aqueous phase is recycled as cleaning water. In this system, the cleaning water prepared by reusing the aqueous phase is adjusted to an acid value of not greater than 10 and a pH value of 7.0 to 9.0. Controlling the amount of low molecular acid components in the aqueous phase in this manner prevents an abnormal viscosity increase in the filtration-concentration of the waste paint-cleaning water mixture.

4 Claims, 3 Drawing Sheets

METHOD FOR RECYCLING A PAINT RECOVERY EFFLUENT

FIELD OF THE INVENTION

The present invention relates to a method for recycling an effluent water in a paint recovery system where a waste water-based paint trapped in a spray booth cleaning water is separated from the cleaning effluent for reuse.

BACKGROUND OF THE INVENTION

Spray coating with a water-based paint in a spray booth involves generation of large quantities of paint mist particles not deposited on a substrate and these mist particles are generally trapped in a spray booth cleaning water (booth circulating water) as a dilute aqueous solution or dispersion of the paint. While the paint mist so collected in the cleaning water amounts to a substantial quantity, discarding the waste paint-containing water as it is results not only in a loss of the paint but also in pollution problems.

Studies have been undertaken on the recovery and reuse of the paint trapped in cleaning water and Japanese Kokai Publication Sho-49-51324, for instance, describes such a recovery technique. According to this technique, a dilute solution or dispersion of the paint available on entrapment of the spray mist in spray-booth cleaning water is concentrated by means of an ultrafiltration membrane or reverse-osmosis filter membrane to a level comparable to the nonvolatile content of the original water-based paint. Thus, this dilute aqueous paint solution or dispersion is concentrated to separate the water-based paint for reuse.

When the dilute aqueous paint solution or dispersion is concentrated using an ultrafiltration or other membrane filter for recovering the trapped paint from the cleaning water as mentioned above, a large quantity of effluent water (hereinafter referred to as filtrate) is produced. To discard this filtrate, a system for disposal of the waste water will have to be provided. To avoid this, the filtrate is usually returned to the spray booth for reuse as cleaning water.

However, in recycling said filtrate as spray-booth cleaning water, repetition of the recovery of dilute waste paint-water mixture, filtration-concentration thereof and the reuse of the filtrate leads ultimately to an abnormal increase in the viscosity of the paint being concentrated in the paint recovery step so that it becomes increasingly difficult to continue concentration up to a level approximating the nonvolatile matter concentration of the original paint (for example about 50%) and, moreover, it takes a long time for the filtration-concentration to be carried through.

Not fully clear is the mechanism by which the repeated use of the filtrate causes an increase in the viscosity of the paint being recovered but the following mechanism may be tentatively suggested. Thus, a water-based paint contains low molecular weight acid components of diverse origins, such as the unreacted acid monomer originating from the stage of synthesis of the main component resin of the paint, low molecular weight acid-containing polymers secondary produced in the synthesis of the resin, decomposition products of the resin which are formed in the neutralization of a resin varnish with, for example, an amine compound, and products of hydrolysis which are formed in the repeated spray coating, trapping of paint mist in cleaning water, concentration-separation and recycling of the paint under high-temperature conditions, for example in the summer months. When such a dilute solution or dispersion of the water-based paint in cleaning water is filtered, the low molecular weight acid components dissolved in the cleaning water find their way into the filtrate and as the filtration procedure is repeated, the low molecular weight acid components are accumulated in increasing concentrations in the filtrate to be recycled. In the dilute aqueous paint solution or dispersion which is available on trapping the paint mist in such a filtrate rich in low molecular weight acid components, the resin in the paint has been stabilized by such accumulated low molecular acid components but these low molecular weight acid components find their way into the filtrate in the filtration-concentration step for recovery of the paint, with the result that not only the resin in the recovered paint is unstable but the viscosity is increased to detract from the efficiency of filtration, thus making it impossible to carry out concentration up to a level comparable to the nonvolatile matter content of the original paint.

Having been developed under the above circumstances, the present invention has for its object to provide a method of recycling the filtrate available from a waste paint-cleaning water mixture after recovery of the paint without compromise of the concentration efficiency of the paint-water mixture.

SUMMARY OF THE INVENTION

The method for recycling a paint recovery effluent according to the present invention con, rises recovering a waste paint-cleaning water mixture 2 available on trapping a water-based paint in cleaning water 1, separating the same 2 into a paint fraction and an effluent water fraction for recovery of the paint and reusing the effluent water 3, characterized in that the cleaning water 1 prepared by recycling the effluent water 3 so separated is adjusted to an acid value of not greater than 10 and a pH value of 7.0 to 9.0.

In practicing the present invention, ultrafiltration can be used as means for separating the waste paint-cleaning water mixture into said paint fraction and effluent water fraction. In a preferred mode of practicing the present invention, which pertains to the case where the water-based paint trapped in cleaning water 1 is a mixture of recovered paint and fresh paint, the acid value of the cleaning water 1 prepared by reusing the effluent water 3 is adjusted according to the volume ratio of recovered paint to fresh paint to the range enclosed by straight lines interconnecting points (0, 0), (10, (10, 50), (5, 100) and (0, 100) on x-y coordinates where the axis y represents the volume percentage of recovered paint and the axis x represents the acid value of the cleaning water prepared using the effluent.

Furthermore, in the practice of the present invention, it is preferable to use, as the water-based paint, a composition comprising a water-soluble alkyd or acrylic resin with an acid value of 25 to 100, a hydroxyl value of 35 to 200 and an Sp value of 10.0 to 11.0 as a main resin component and a curing agent with an SP value higher that the SP value of said water-soluble alkyd or acrylic resin by 0.5 to 3.0.

DESCRIPTION OF THE INVENTION

The present invention will be now discussed in detail.

Figure 1:
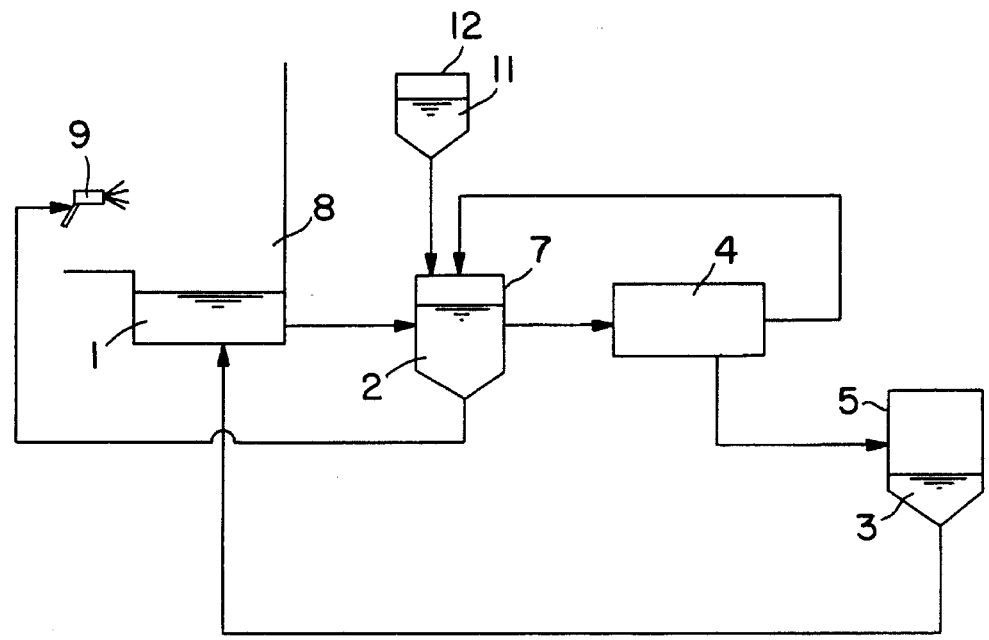
FIG. 1 is a schematic view showing the paint concentration-recovery-recycling system for use in the present invention.

FIG. 1 shows an exemplary coating-concentration-recovery system for a water-based paint. The water-based paint that can be used is not particularly restricted in kind but includes the conventional water-based alkyd resin paint and water-based acrylic resin paint for spray coating. The present invention can be applied with particular advantage, among such paints, to the water-based alkyd resin paint, for this type of paint generally tends to contain unreacted acid monomers originating from the process of resin synthesis and be rich in low molecular weight acid components. When a substrate is spray-coated with such a water-based paint in a spray booth 8, like the one illustrated in FIG. 1, the paint mist not deposited on the substrate is trapped, by dissolution or dispersion, in the cleaning water 1 circulated within the spray booth 8. As the paint mist is trapped in cleaning water 1 in this manner, the concentration of the paint in the cleaning water 1 is progressively increased as the spray-coating operation is continued so that the level of nonvolatile matter in the cleaning water 1 is increased. As the concentration of nonvolatile matter in cleaning solution 1 reaches a predetermined level, the cleaning water 1 containing the dissolved or dispersed paint is transferred to a paint concentration tank 7 and this waste paint-cleaning water mixture 2 is then filtered by a filtration unit 4.

The filtration unit 4 is not restricted in type only provided that it is capable of separating said waste paint-cleaning water mixture into the paint and water. Generally, however, an ultrafiltration device equipped with an ultrafiltration membrane and a reverse osmosis filter device equipped with a reverse osmosis filter membrane, such as those proposed in Japanese Kokai Publication Sho-49-51324, for instance, can be employed. The waste paint-cleaning water mixture 2 transferred to the concentration tank 7 and filtration unit 4 is concentrated and filtered and this concentrated waste paint-water mixture 2 is further returned to the concentration tank 7 and filtration unit 4 until the paint is finally concentrated to a level approximating the nonvolatile matter concentration of the original paint to provide a recovered paint. On the other hand, the filtrate 3 of the waste paint-cleaning water mixture 2 as separated by the filter unit 4 is recovered in a filtrate tank 5, from which it is recycled to the spray booth for use as cleaning water 1.

When the coating-concentration-recycling system illustrated in FIG. 1 is operated for the first time using fresh cleaning water 1 and a fresh water-based paint or when the cleaning water 1 is discarded for cleaning the system including the spray booth 8, it is common practice to use fresh water supplemented with an appropriate amount of a hydrophilic solvent such as butyl-cellosolve as the cleaning water 1 and, therefore, it is not necessary to adjust the water quality for reducing the amount of low molecular weight acid components.

In contrast, when the effluent or filtrate 3 separated from the waste paint-cleaning water mixture in the above manner is returned to a source of booth circulating water (master batch) to be recycled to the spray booth 8, the filtrate 3 is rich in accumulated low molecular weight acid components and if it is directly used as cleaning water 1 for trapping the paint and the resultant waste paint-cleaning water mixture 2 is concentrated by filtration, the viscosity of the paint obtained as a concentrate tends to be increased.

In the present invention, therefore, in returning the filtrate 3 of the waste paint-cleaning water mixture to said master batch source for preparing cleaning water 1, the amount of low molecular weight acid components is adjusted so as to prevent said abnormal increase of viscosity. To be specific, the cleaning water 1 prepared by recycling the filtrate 3 is adjusted to an acid value of not greater than 10 and a pH value of 7.0 to 9.0 to thereby control the concentration of low molecular weight acid components of cleaning water 1.

The acid value (AV) of cleaning water is the number of milligrams of KOH necessary to neutralize the acid in 1 g of cleaning water 1, which can be determined by neutralization titrimetric apparatus on the market using a 0.1N aqueous solution of potassium hydroxide. Any acid value of greater than 10 means that the cleaning water 1 contains an excessive amount of low molecular weight acid components and, hence, an excessively high viscosity of the paint being recovered to make it difficult to carry out concentration to the level of the original paint.

The water-based paint for spray coating in the spray booth 8 includes not only a fresh paint but also a paint recovered by concentrating said waste paint-cleaning water mixture. The latter paint if employed, is generally used as blended with the fresh paint. Since the resin in the recovered paint is not uniformly water-soluble as compared with the resin in the fresh paint, it is recommended that the limit acid value of cleaning water 1 be determined according to the volume percentage of the recovered paint in the mixed paint.

Thus, the acid value of cleaning water or the operation using such a paint mixture is preferably controlled within the range enclosed by straight lines interconnecting points (0, 0), (10, 0), (10, 50), (5, 100) and (0, 100) on the x-y coordinates where the y-axis represents the volume percentage of the recovered paint in the mixed paint and the x-axis represents the acid value of cleaning water prepared using the filtrate 3. This range is shown in solid lines in FIG. 2.

The still more preferred range is the range enclosed by lines interconnecting points (0, 0), (5, 0), (5, 50), (4,100) and (0, 100) on said x-y coordinates. When the acid value lies within this range, the viscosity of the paint recovered by concentration-filtration is rather less viscous than the original paint and can be concentrated to a level even higher than the concentration of the original paint, thus facilitating the adjustment of the paint after recovery and shortening the concentration time.

Any known technology can be used for adjusting the amount of low molecular weight acid components in the cleaning water 1 prepared using the filtrate 3 from the waste paint-cleaning water mixture so as to control the acid value of cleaning water 1 within the above-mentioned range. Thus, there is no particular restriction to the methodology that can be used but the following procedures can be mentioned by way of example.

(1) When the concentration of low molecular weight acid components in the filtrate 3 recovered from the waste paint-cleaning water mixture 2 is too high, this filtrate 3 can be diluted with water to adjust the acid value and the resultant dilution be used to prepare the cleaning water master batch. In this method, dilution of the filtrate 3 with water results in an increased volume so that it may not be possible to reuse the entire amount for the master batch and some of the dilution will have to be discarded, with the result that the method does not provide for a completely closed system. However, since the method is simple, it is of practical value.

(2) When the concentration of low molecular weight acid components in the filtrate 3 of waste paint-cleaning water mixture 2 is too high, the low molecular weight acid components in the filtrate 3 can be removed by the reverse osmosis method to achieve an acid value necessary for the preparation of a master batch. In this method, the concentrated solution of low molecular weight acid components must be discarded so that no closed circuit can be established. However, since the amount that must be disposed of is small, the method is of practical value.

(3) In preparing a water-based paint, the varnish constituting the paint is diluted with water and the water is filtered by, for example, ultrafiltration to dissolve the low molecular weight acid components in the water to thereby remove them along with the filtrate water and, hence, reduce the level of low molecular weight components in the water-based paint. By using this water-based paint lean in low molecular weight components, the concentration of low molecular weight components in the filtrate can be decreased.

(4) In synthesizing the varnish constituting the water-based paint, the reaction procedure is judiciously engineered, for example by prolonging the condensation time of the acid monomer, to provide a varnish lean in low molecular weight acid components and by using a water-based paint prepared from such a varnish with a decreased low molecular weight acid fraction, the concentration of low molecular weight components in the filtrate 3 can be decreased.

The pH of cleaning water 1 prepared using the filtrate 3 from the waste paint-cleaning water mixture 2 should be controlled within the range of 7.0 to 9.0 as mentioned previously. If the pH is less than 7.0, the paint being recovered is too viscous to make impossible the concentration to the desired nonvolatile matter content (e.g. 50%) even when the acid value of cleaning water 1 lies within the specified range. Conversely, if the pH is high beyond 9.0, the recovered paint in use or storage undergoes accelerated hydrolysis reaction to give increased amounts of low molecular weight acid components and thereby increase the viscosity of the paint.

The pH of cleaning water 1 can be adjusted with a base. This base may be any basic substance that is evaporated on baking of the paint film and is preferably the same amine as that used for neutralizing the water-based paint in its production. It is common practice as previously mentioned to add a hydrophilic organic solvent, such as butyl-cellosolve, to cleaning water 1 in the spray booth 8 in order to insure a stable dispersion of the water-based paint in the water. While the level of addition of such solvent can be selected as needed, the range of 1 to 5% is recommended for butyl-cellosolve from the standpoint of working safety.

A hydrophilic solvent such as butyl-cellosolve is generally added to a water-based paint in order to disperse the film-forming water-soluble resin uniformly in water. When the waste paint-cleaning water mixture 2 is passed through said filtration unit 4, the hydrophilic solvent added to the water-based paint is removed together with water so that the proportion of the organic solvent to the water-soluble resin is decreased in the recovered paint. As a consequence, the water-soluble resin in the recovered paint is in the dispersed state rather than in the dissolved state, thus causing aggregation of the pigment and separation of the paint as well as delustering the paint film. To cope with such a situation, the same organic solvent 11 as that incorporated in the water-based paint is supplied from a solvent tank 12 to the waste paint-cleaning water mixture 2 in the concentration tank 7 and the resultant waste paint-cleaning water mixture 2 is concentrated and filtered. The addition of said organic solvent 11 to the waste paint-cleaning water mixture may be carried out by feeding the solvent 11 in small portions continuously to the concentration tank 7 or on an intermittent basis, e.g. feeding the organic solvent 11 to the concentration tank 7 when the nonvolatile matter consent has reached a predetermined level during the progress of concentration and further when or each time the nonvolatile matter content has reached the predetermined level. All that is necessary is that the organic solvent 11 be added so that its proportion relative to the film-forming water-soluble resin in the recovered paint will not be too low compared with its content in the original water-based paint. The proper level of addition of such organic solvent 11 is dependent on the type of water-based paint and can be empirically determined. As the waste paint-cleaning water mixture 2 is thus supplemented with the organic solvent, concentrated and filtered, the nonvolatile matter concentration of the recovered paint can be increased to a level approximating that of the original water-based paint and, at the same time, the concentration of the organic solvent 11 is controlled to a level comparable to that in the original water-based paint. While there is no particular restriction to the type of water-based paint which can be used in the present invention, it is preferable, for positive separation of the paint fraction by the filtration-concentration of the waste paint-cleaning water mixture, to use a water-based paint comprising a water-soluble resin with increased water solubility. However, the water-based paint prepared using such a water-soluble resin with increased solubility has the drawback that it is comparatively poor in film characteristics such as resistance to moisture absorption and to boiling water.

Therefore, in the present invention, it is preferable to use the following water-based paint, which is particularly suitable for recovering the paint by the filtration-concentration of the waste paint-cleaning water mixture. Thus, the preferred water-based paint is a paint composed predominantly of a water-soluble alkyd or water-soluble acrylic resin having an acid value of 25 to 100, a hydroxyl value of 35 to 200 and an SP value of 10.0 to 11.0 and containing a curing agent having an SP value higher than the SP value of said water-soluble alkyd or acrylic resin by 0.5 to 3.0.

The above-mentioned water based paint is now described in detail. While said water-soluble alkyd resin or said water-soluble acrylic resin, or both of them, can be used, such water-soluble alkyd or acrylic resin should have an acid value (AV) of 25 to 100, a hydroxyl value (OHV) of 35 to 200 and an SP value of 10.0 to 11.0 as mentioned above. If the acid value of the resin is less than 25, the hydroxyl value is less than 35 or/and the SP value is less than 10.0, the water solubility (hydrophilicity) of the water-soluble alkyd or acrylic resin will be too low and consequently a phase separation, for instance, may take place in the course of concentration. On the other hand, if the acid value exceeds 100, the hydroxyl value exceeds 200, the SP value exceeds 11.0, the water solubility (hydrophilicity) of the water-soluble alkyd or acrylic resin will be too high and consequently the paint film may be poor in, for example, water resistance.

The SP (solubility parameter) value is a measure of solubility and determined by the following procedure.

Reference: Sub, Clarke [J.P.S.A.-1, 5, 1671–1681 (1967)]

Measuring temperature: 20° C.

Sample: Weigh 0.5 g of the resin into a 100 ml beaker, add 10 ml of a good solvent using a whole pipette and dissolve by means of a magnetic stirrer.
Solvent:
Good solvent: Dioxane, acetone
Poor solvent: n-Hexane, deionized water
Determination of cloud point: Using a 50 ml biuret, drip the poor solvent and read the amount dripped up to the point where clouding takes place.
Calculation: The SP value δ of the resin is given by the following equation:

$$\delta = (V_{ml}^{1/2}\delta_{ml} + V_{mh}^{1/2}\delta_{mh})/(V_{ml}^{1/2} + V_{mh}^{1/2})$$

$$V_m = V_1 V_2/(\phi_1 V_2 + \phi_2 V_1)$$

$$\delta_m = \phi_1\delta_1 + \phi_2\delta_2$$

Vi: the molar volume of each solvent (ml/mol)
φi: the volume fraction of each solvent at cloud point
δi: the SP value of each solvent
ml: low SP poor solvent mixture system
mh: high SP poor solvent mixture system While the curing agent (crosslinking agent) may be an amino resin such as melamine resin or benzoguanamine resin, there is employed one adjusted so that its SP value is higher that that of the water-soluble alkyd or acrylic resin by 0.5 to 3.0. By using a curing agent having an SP value within the above range with respect to the water-soluble alkyd or acrylic resin, the paint film obtainable by curing of the water-soluble resin on the substrate surface can be rendered hydrophobic so that the film properties such as anti-hydroscopic property and resistance to boiling water may be enhanced.

If the difference in SP value between the curing agent and the water-soluble alkyd or acrylic resin is less than 0.5 (inclusive of the case in which the SP value of the curing agent is lower than the SP value of the alkyd or acrylic resin), the stability of the water-based paint composition is adversely affected to cause separation. Conversely when the SP difference exceeds 3.0, the desired improvements in film properties such as resistance to moisture absorption and resistance to boiling water cannot be obtained.

A water-based paint can be manufactured by compounding said water-soluble alkyd or acrylic resin and curing agent with a pigment, a water-soluble organic solvent, etc. The pigment mentioned above includes colored pigments such as titanium dioxide, carbon, quinacridone, etc. and extenders such as calcium carbonate and its level of addition is preferably PVC =about 0 to 35%. The water-soluble organic solvent may for example be butylcellosolve. The ratio of water-soluble alkyd or acrylic resin and curing agent is preferably 50:50 to 95:5 on a solid basis.

The resultant water-based paint is diluted with water before application to the substrate. As mentioned previously, the free paint mist generated in spray-coating with this water-based paint is trapped in cleaning water and the resultant waste paint-cleaning water mixture is filtered to remove the water and recover the paint. Since, in the present invention, the water-based paint is prepared using a curing agent having an SP value higher than the SP value of the water-soluble alkyd or acrylic resin by 0.5 to 3.0 so as to improve the film properties such as resistance to moisture absorption and resistance to boiling water, it is possible to employ a water-soluble alkyd or acrylic resin with comparatively high water solubility as pointed out previously and, as a consequence, separation of the water-soluble alkyd or acrylic resin in the filtration-concentration of the waste paint-cleaning water mixture can be positively prevented and the deterioration of film properties be also prevented.

EXAMPLES

The following examples are further illustrative of the present invention.

Example 1

An alkyd resin with an acid value of 50, a hydroxyl value of 40 and a number average molecular weight of 3300 was dissolved in butyl-cellosolve to prepare an alkyd resin varnish with a nonvolatile matter content of 75 weight %. This varnish was neutralized to 100% theoretical and diluted with deionized water to a nonvolatile matter content of 40 weight % to provide a water-soluble alkyd resin varnish having an SP value of 10.5. To 108 parts by weight of this water-soluble alkyd resin varnish were added 11 parts by weight of methanol/ethanol-notified benzoguanamine resin (Mitsui Cyanamid, Ltd.; Cymel 1123; nonvolatile matter 100%, SP 11.47), 100 parts by weight of titanium dioxide and 2.5 parts by weight of silica to prepare a water-based paint.

This water-based paint was diluted with water to a nonvolatile matter content of 55 weight %. On the other hand, butylcellosolve and deionized water were blended in a weight ratio of 2:98 and adjusted to AV=4 and pH 8.5 to provide a cleaning water master batch.

Then, in a spray booth 8 supplied with the cleaning water 1 fed from this master batch, a substrate was spray-coated with the above paint dilution. The paint mist was trapped in this cleaning water 1 within the spray booth 8. When the nonvolatile matter content of the trapping water had reached 15 weight %, this waste paint-cleaning water mixture 2 was transferred from the spray booth 8 to the concentration tank 7 and filtered through the ultrafiltration unit 4 employing Desalination Systems' EW4026 as the ultrafiltration membrane. The filtration procedure was continued until a recovered paint with a nonvolatile matter content of 55 weight % and a filtrate 3 were obtained.

Using the above filtrate 3 as the master batch for cleaning water 1 in the spray booth 8 shown in FIG. 1, spray-coating was carried out. The cleaning water 1 was maintained at pH 8.2 to 9.0 and controlled to the acid values shown in Table 1.

The cleaning waters having these acid values were controlled at temperature of 25° to 35° C. and circulated to the spray booth 8 at an average flow rate of 15.7 l/h. Regarding the paint, as shown in Table 1, the fresh water-based paint, recovered paint and mixed paint were used in spray-coating in the spray booth 8.

TABLE 1

| Recovered paint (vol. %) | Fresh paint (vol. %) | Acid value of cleaning water |
|---|---|---|
| 100 | 0 | 0 |
|  |  | 4.0 |
|  |  | 5.0 |
|  |  | 5.5 |
| 70 | 30 | 5.0 |
|  |  | 7.0 |
| 50 | 50 | 0 |
|  |  | 3.2 |
|  |  | 4.7 |
|  |  | 6.8 |

TABLE 1-continued

| Recovered paint (vol. %) | Fresh paint (vol. %) | Acid value of cleaning water |
| --- | --- | --- |
|  |  | 10.5 |
|  |  | 12.0 |
| 0 | 100 | 0 |
|  |  | 4.3 |
|  |  | 10.5 |

The paint mist was trapped in cleaning water 1 and when the nonvolatile matter content of the water had reached 17%, 14.7 kg of the cleaning water 1 was transferred from the spray booth 8 to the concentration tank 7 and concentrated by passage through the ultrafiltration unit 4 over a period of 180 minutes to recover the paint. This recovered paint was subjected to measurement of viscosity at 20° C. and concentration of nonvolatile matter. As to the recovered paint with a high nonvolatile matter content of more than 50%, it was diluted with water to a nonvolatile matter content of 50% and the viscosity of the dilution was measured. The viscosity measurement was carried out by using the #4 Ford cup and counting the time of paint outflow. In the graph given in FIG. 2, 'O' represents a recovered paint viscosity of not greater than 60 seconds and nonvolatile matter content of not less than 50%; 'Δ' represents a recovered paint viscosity of 60 to 150 seconds and nonvolatile matter content of 45 to 50%; and 'X' represents a recovered paint viscosity of not less than 150 seconds and nonvolatile matter content of not more than of 45%. The viscosity of the original paint was 60 seconds, which means that 'O' in FIG. 2 represents a decrease in viscosity.

Figure 2:
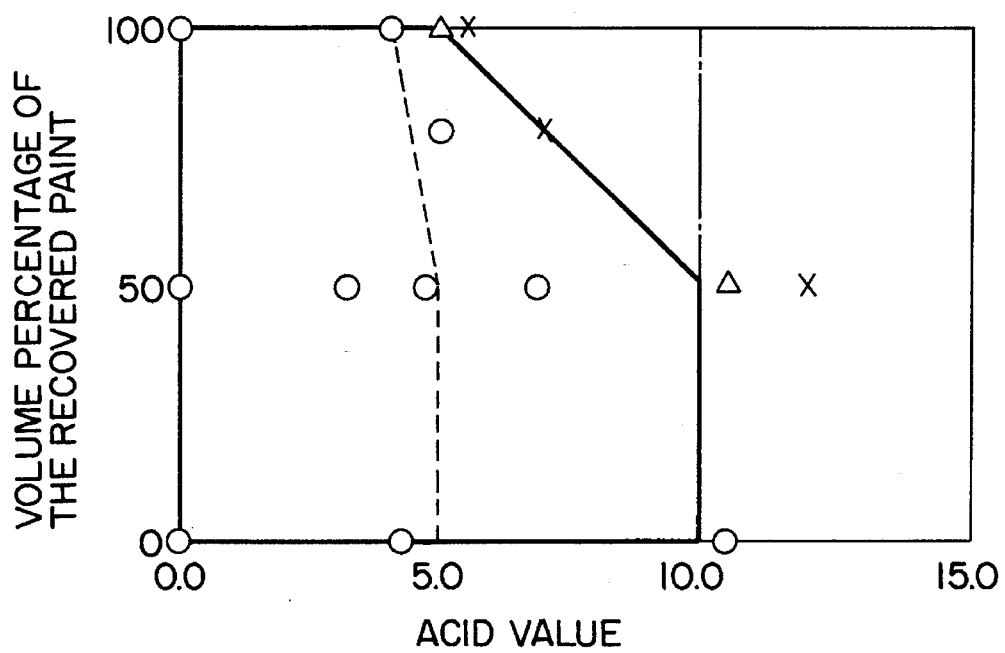
FIG. 2 is an x-y coordinates diagram wherein y represents the volume percentage of the recovered paint in the mixed paint and x represents the acid value of the cleaning water prepared by recycling the filtrate.

It is clear from FIG. 2 that when a fresh paint is used, the concentration for recovery can be carried out under suppression of viscosity increase by controlling the acid value of cleaning water 1 to a value not greater than 10. When a mixture of fresh paint and recovered paint is used, too, provided that the volume percentage of the recovered paint is not greater than 50%, the concentration without involving a viscosity increase can be carried out by controlling the acid value of cleaning water to a level not greater than 10. Since the paint recovered by trapping in cleaning water accounts for only a minor proportion of the paint used for a spray coating job, the recovered paint is generally blended, if done, with the fresh paint in a proportion not exceeding 50%. However, a mixed paint containing more than 50% by volume of recovered paint is used under certain circumstances, in which cases it is necessary that the acid value be controlled within the range enclosed by straight lines interconnecting points (0, 0), (10, 0), (10, 50), (5, 100) and (0,100) on the x-y coordinates where the y-axis represents the volume percentage of the recovered paint and the x-axis represents the acid value of cleaning water prepared by reusing the filtrate.

Example 2

In using the recovered filtrate 3 as a master batch for cleaning water 1 in the spray booth 8, the pH of the cleaning water 1 was adjusted to various values while its acid value was kept constant at 3.2. On the other hand, a mixed paint containing the recovered paint in a proportion of 50% was used as the paint for spray coating. Under the above conditions, a spray-coating operation was carried out in the same manner as Example 1. The paint mist was trapped in cleaning water 1 until the nonvolatile matter concentration of the cleaning water became 17%. Then, 14.7 kg of the cleaning water was transferred from the spray booth 8 to the concentration tank 7 and this waste paint-cleaning water mixture 2 was subjected to ultrafiltration as in Example 1 until the nonvolatile matter content was increased to about 50%.

The viscosity of the resultant recovered paint was measured by the #4 Ford cup method at 20° C. The results are shown in FIG. 3.

Figure 3:
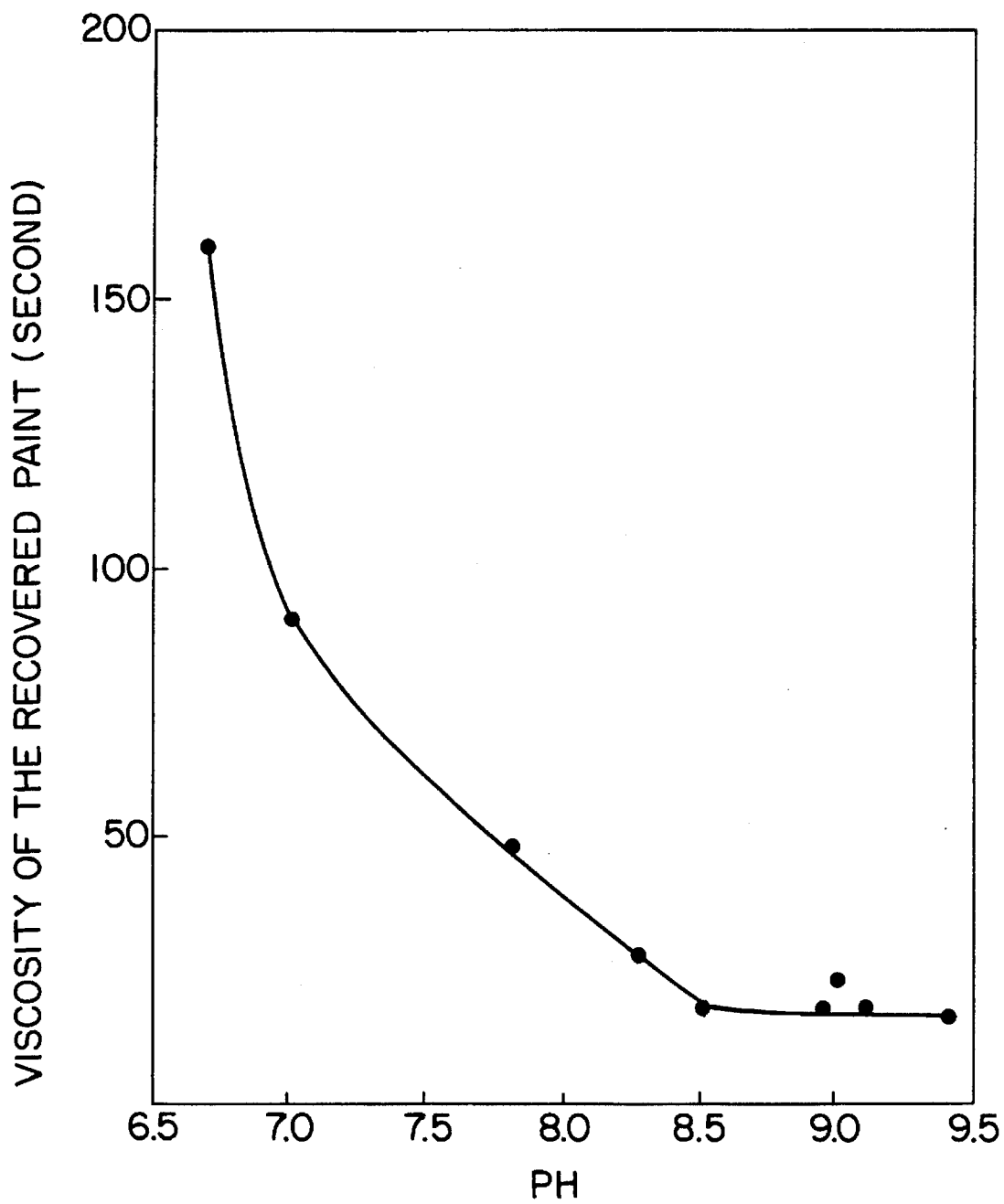
FIG. 3 is a graph showing the relationship between the pH of cleaning water and the viscosity of the recovered paint.
Figure 4:
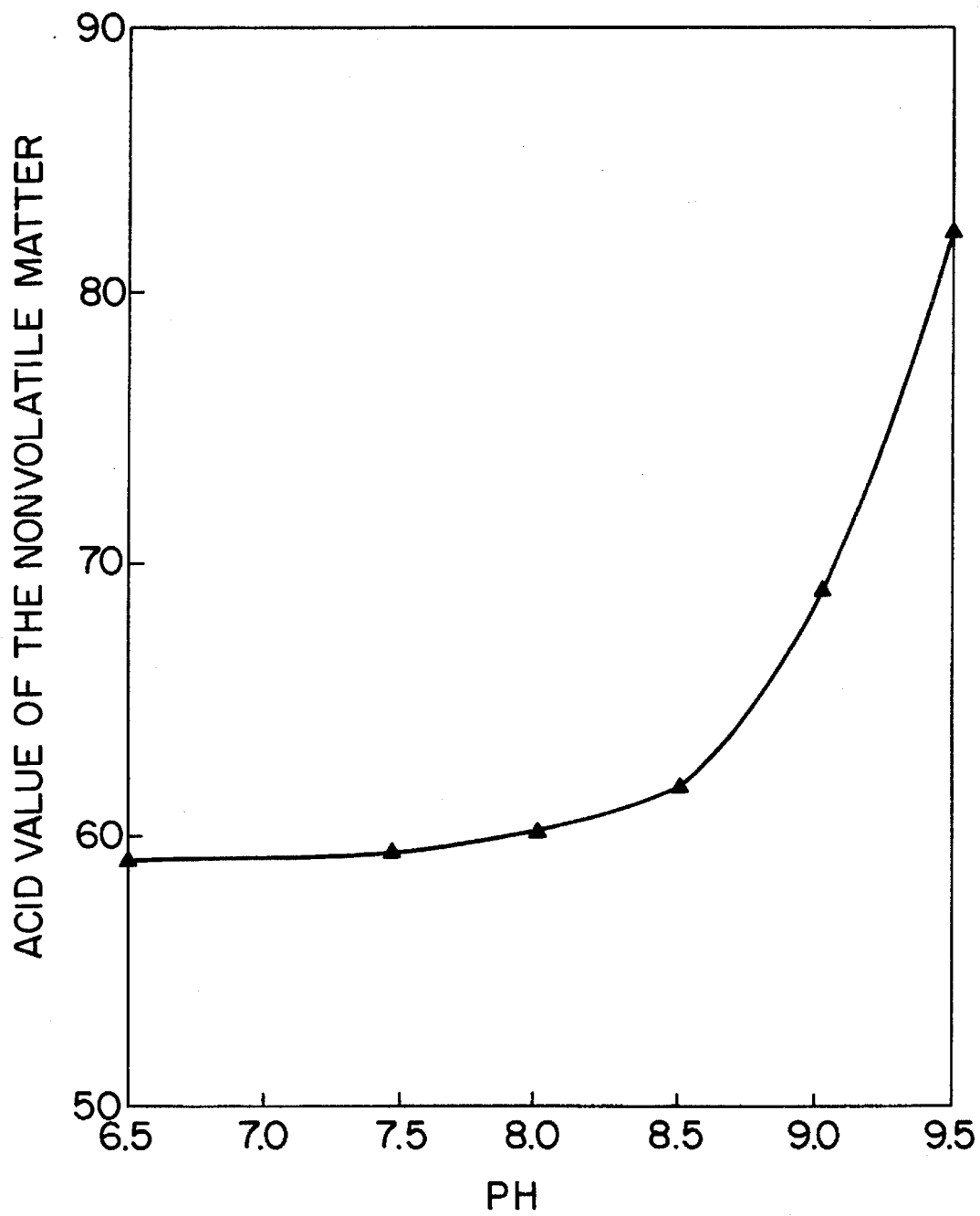
FIG. 4 is a graph showing the relationship between the pH of cleaning water and the acid value of the nonvolatile matter content of the paint after storage.

As clear from FIG. 3, the viscosity of the recovered paint was increased over the viscosity (60 seconds) of the original paint when the pH was less than 7.0. Even when the pH was over 9.0, there is no viscosity increase of the recovered paint but when this recovered paint was stored at 40° C. for 30 days, it underwent extensive hydrolysis and showed a considerably increased acid value. FIG. 4 shows the relationship between the acid value of the paint solids and the pH of cleaning water. When the pH was 9.0, the acid value increased to 1.3 times the initial acid value (55). At pH 9.5, the acid value became 1.5 times the initial value. When the pH exceeded 9.0, the acid value increased beyond the usually acceptable limit.

Example 3

A reactor equipped with a stirrer, temperature control and decanter was charged with the following materials and the charge was heated with stirring.

Soybean fatty acid 34 parts by weight
Isophthalic acid 25 parts by weight
Trimellitic anhydride 9 parts by weight
Trimethylolpropane 31 parts by weight
Xylene 1 part by weight
Dibutyltin oxide 0.02 part by weight The water secondary produced with progress of the reaction was azeotropically removed together with xylene and the heating was continued until an acid value of 50 and a hydroxyl value of 125 were obtained. The resultant resin was diluted with butylcellosolve to a nonvolatile matter concentration of 73 weight % to prepare an alkyd resin varnish. This resin varnish had a Gardener viscosity of $Z_2$ and an SP value of 10. 37. This resin varnish was neutralized to 100% theoretical and adjusted with deionized water to a nonvolatile matter content of 40 weight %. To 108 parts by weight of this water-soluble alkyd resin varnish were added 11 parts by weight of the same methanol/ethanol-modified benzoguanamine resin as used in Example 1, 100 parts by weight of titanium dioxide and 2.5 parts by weight of silica to prepare a water-based alkyd resin paint.

This water-based alkyd resin paint was diluted with water to a nonvolatile matter concentration of 55 weight % and a substrate was spray-coated with this paint in a spray booth 8 supplied with cleaning water 1 at an average flow rate of 54 l/h from 15 m³ of a master batch controlled to an acid value of 1.5 to 4.5 and a pH value of 8.5 to 9.0. When the concentration of the nonvolatile matter in the cleaning water had reached 17 weight %, it was subjected to ultrafiltration as in Example 1 until a nonvolatile matter content of 55% was obtained. The recovered paint thus obtained was blended with the fresh water-based alkyd resin paint in a volume ratio of 1:1 and the coating, concentration and recovery cycle was repeated. This operation was repeated for a total of 10 times. As a result, no increase of viscosity was found, with the #4 Ford cup viscosity values at 50% nonvolatile matter and 20° C. being consistently within the range of 12 to 60 seconds. Thus, the trapped paint could be concentrated to not less than 50% solid matter without being accompanied by viscosity increase.

In causing a water-based paint mist to be trapped in a spray-booth cleaning water, recovering the paint by concentrating the resultant waste paint-cleaning water mixture and recycling the filtrate water, the present invention comprises adjusting the cleaning water prepared using the filtrate water to an acid value of not greater than 10 and a pH value of 7.0 to 9.0 to thereby control the concentration of low molecular weight acid components in the cleaning water so that the abnormal viscosity increase in the filtration-concentration of the waste paint-cleaning water mixture and consequent decrease in filtration efficiency can be prevented and, at the same time, the concentration up to the nonvolatile matter concentration of the original paint can be insured.

What is claimed is:

1. A method for recycling a paint recovery effluent comprising recovering a waste water-based paint in cleaning water, wherein said water-based paint is a composition comprising a water-soluble alkyd or acrylic resin with an acid value of 25 to 100, a hydroxyl value of 35 to 200 and an SP value of 10.0 to 11.0 as a main component and a curing agent with an SP value higher than the SP value of said water-soluble alkyd or acrylic resin by 0.5 to 3.0, and wherein said SP value is a solubility parameter value, which is a measure of solubility and determined by the procedure described by Suh, Clarke (J.P.S.A.-1,5, 1671–1681 (1967), separating the paint from the resultant waste paint-cleaning water mixture thereby obtaining an effluent containing acid and reusing the resulting effluent in the preparation of cleaning water, wherein the cleaning water prepared using said effluent is adjusted to an acid value of not greater than 10, wherein said acid value is the number of milligrams of KOH necessary to neutralize the acid in 1 gram of cleaning water, and a pH value of 7.0 to 9.0.

2. A method for recycling a paint recovery effluent according to claim 1 wherein said separation of the paint from the waste paint-cleaning water mixture is effected by ultrafiltration.

3. A method for recycling a paint recovery effluent according to claim 2 wherein when the waste water-based paint recovered in cleaning water is a mixture of recovered paint and fresh paint, the acid value of the cleaning water prepared by reusing the effluent is adjusted according to a volume ratio of recovered paint to fresh paint to the range enclosed by straight lines interconnecting points (0, 0), (10, 0), (10, 50), (5, 100) and (0, 100) on x-y coordinates where the axis y represents the volume percentage of recovered paint and the axis x represents the acid value of the cleaning water prepared by using the effluent, as shown in FIG. 2.

4. A method for recycling a paint recovery effluent according to claim 1 wherein when the waste water-based paint recovered in cleaning water is a mixture of recovered paint and fresh paint, the acid value of the cleaning water prepared by reusing the effluent is adjusted according to a volume ratio of recovered paint to fresh paint to the range enclosed by straight lines interconnecting points (0, 0), (10, 0), (10, 50), (5, 100) and (0, 100) on x-y coordinates where the axis y represents the volume percentage of recovered paint and the axis x represents the acid value of the cleaning water prepared by using the effluent, as shown in FIG. 2.

* * * * *